Figure 1:
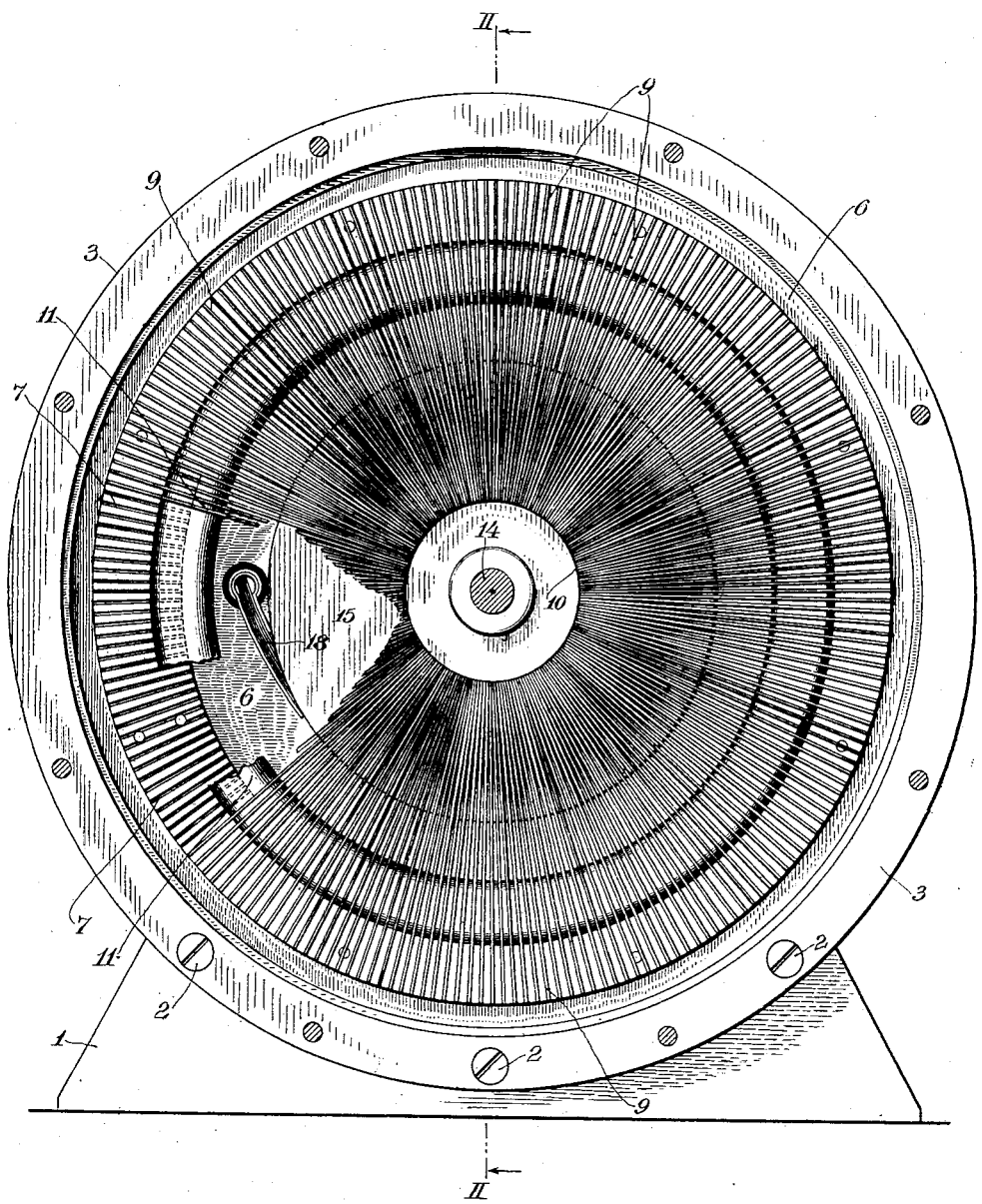

A. S. HUBBARD.
DYNAMO ELECTRIC MACHINE.
APPLICATION FILED JULY 3, 1908.

970,827.

Patented Sept. 20, 1910.
3 SHEETS—SHEET 1.

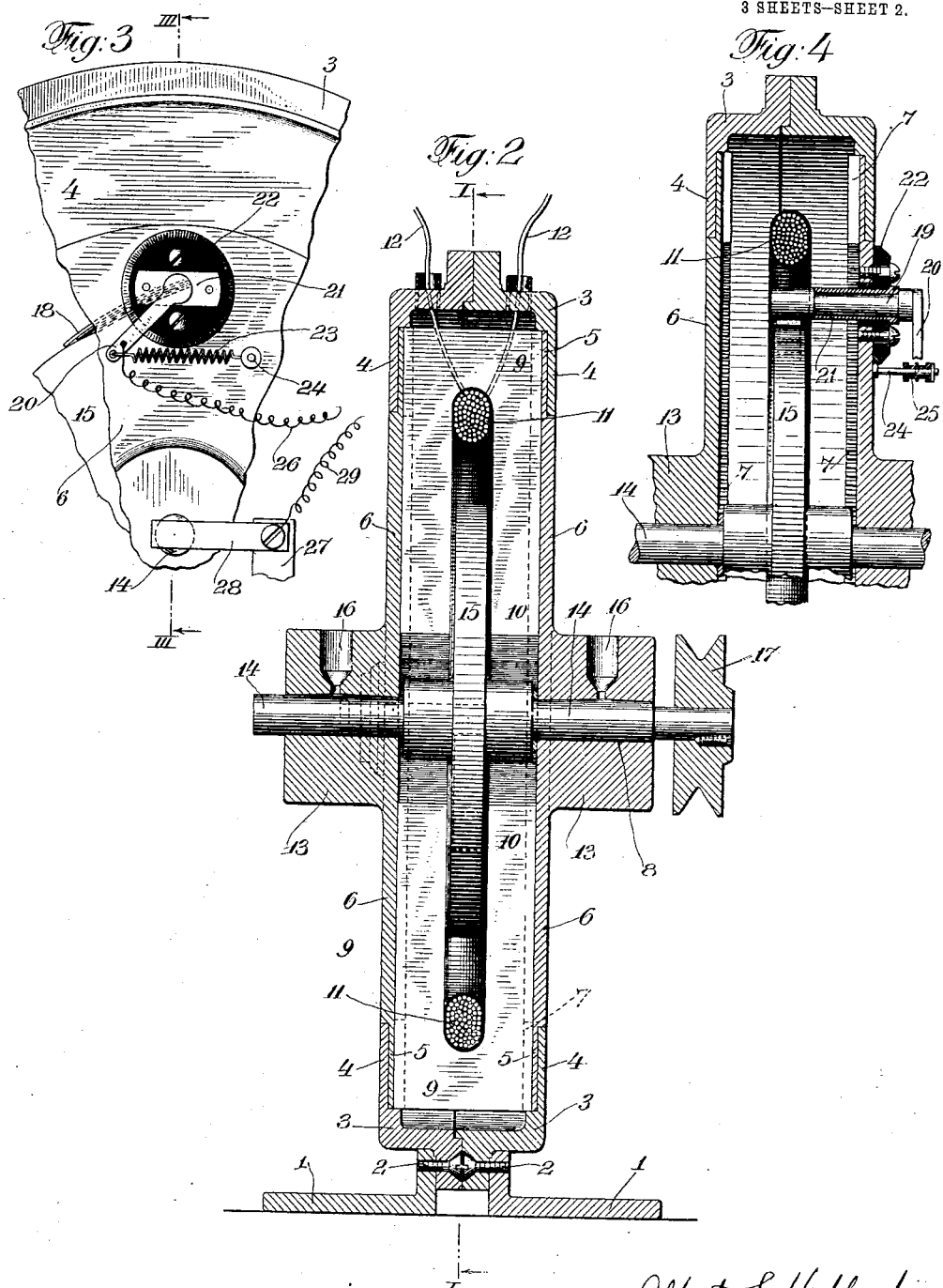

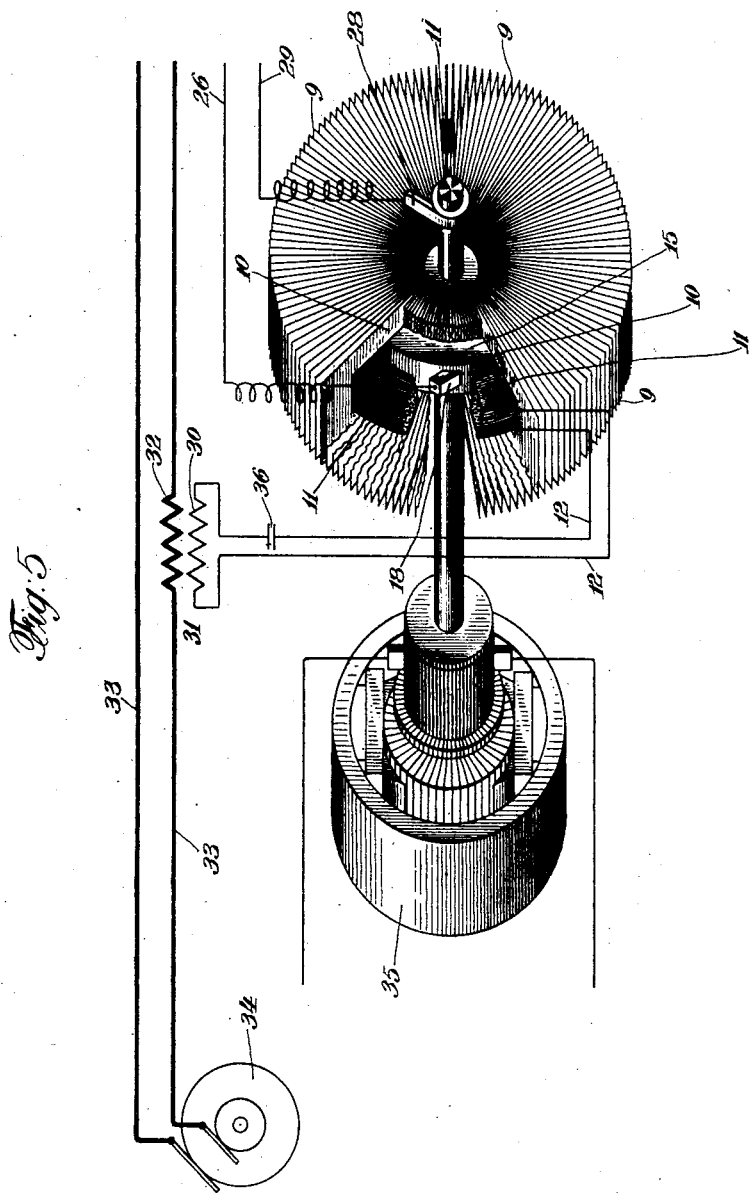

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

DYNAMO-ELECTRIC MACHINE.

970,827.  Specification of Letters Patent.  Patented Sept. 20, 1910.

Application filed July 3, 1908. Serial No. 441,739.

*To all whom it may concern:*

Be it known that I, ALBERT S. HUBBARD, a citizen of the United States, and a resident of Belleville, county of Essex, and State of New Jersey, have invented certain new and useful Improvements in Dynamo-Electric Machines, of which the following is a specification.

In this application I describe and claim subject matter which was disclosed in my prior application, Serial No. 421,932, filed March 18th, 1908, for improvements in electrical systems of distribution.

The present invention relates to dynamo-electric machines and more especially to those with a uniform field or of the unipolar type and for operation with alternating or undulating currents.

Generally speaking it is the object of my invention to provide an alternating current machine which will operate both as a motor or generator without sparking; which will run equally well on currents of very high frequencies and currents of very low frequencies; and, the frequency of which is in no way dependent on the speed. With such a machine it is possible to produce alternating currents of a much lower frequency than with other machines and there is no danger of its falling out of synchronism with variations in speed or load. The fact that extremely low frequency currents can be readily and satisfactorily produced by such a machine makes it especially adaptable as a telephone repeater, in which it is desired to take the feeble undulating current and produce, in synchronism therewith, a relatively much stronger current but having exactly the same wave form and undulations.

Further and more specific objects and features of my invention will clearly appear from the detailed description given below taken in connection with the accompanying drawing which forms a part of this specification.

In the drawing, Figure 1 is a vertical longitudinal sectional view of my improved dynamo-electric machine taken substantially on the line I—I of Fig. 2. Fig. 2 is a vertical sectional view of the same taken on the line II—II of Fig. 1. Fig. 3 is a detail view showing the construction of the brush which rests on the outer part of the armature, and appurtenant mechanism. Fig. 4 is a sectional view of the same taken on the line III—III of Fig. 3. Fig. 5 is a diagrammatical view showing my improved machine connected to a source of alternating current and means for driving it.

Referring to Figs. 1 and 2, 1, 1, represent base plates which have secured thereto by screws 2, 2, 2 circular ring plates 3, 3. These ring plates are provided with flanges 4, 4 which engage on the outside of flanges 5, 5, on the circular side plates 6, 6. The circular side plates, forming part of the frame, are provided with a plurality of long narrow slots 7. Through the center of these circular side plates 6 are apertures 8 for the axle of the armature of the machine. The slots 7 are made radial and in planes parallel to or in the same plane with said axle. Within the slots 7 I arrange a plurality of thin plates or laminations, 9, having a U-shaped form. The legs, 10, of these various laminations extend inwardly beyond the slots 7 and come into close proximity to each other, so as to form a unipolar field structure. The plates or laminations 9 are held firmly by the slots, 7, in planes parallel with the armature shaft and radial to it. Between the legs, 10, of the laminations I arrange a field coil 11 which is circular in form and concentric with the axis of the machine or the axle of the armature. This field coil 11 is supplied or energized by alternating or undulating currents and for this purpose the leads 12 are provided.

In Fig. 5, I have shown the leads 12 connected to the secondary 30 of a transformer 31, the primary 32 of which is connected in series in a circuit 33 fed by a single phase alternator 34. The condenser 36 is included to regulate for phase relation.

The circular side plates 6 are provided with bearings 13 for the shaft 14 of the armature 15. The armature 15 consists in this particular instance of a flat disk or plate, of magnetic material such as steel, circular in form, and extends between the legs, 10, of the U-shaped laminations 9 and is adapted to be rotated therebetween. Oil wells 16 are provided in the bearings 13, and on the outer end of shaft 14 I provide a pulley 17 for rotating the armature 15; or the armature 15 may be directly connected to a motor 35 as shown in Fig. 5.

18 represents a brush bearing upon the outer edge of the armature disk 15, (see Figs. 1 and 3). The brush 18 is connected to a short shaft 19 which extends through one of the side plates 6 and has an arm 20 on its outer end, (see also Fig. 4). The shaft 19 is rotatably mounted in a bushing 21 which is insulated from the side plate 6 by a rubber or mica bushing 22. At the lower end of the arm 20 I secure one end of a spiral spring 23, the other end of said spring 23 being fastened to a pin 24 and insulated therefrom by a suitable covering 25, (see Fig. 4). The spring 23 always maintains the brush 18 in proper contact with the armature disk 15. The current is taken from the armature by means of brush 18, arm 20, and lead 26, at one point. The other terminal of the armature may be any part of the frame of the machine, or a brush 28 bearing on shaft 14 and secured to an upright post 27 and lead 29, as shown in Fig. 3 may be used for this purpose.

When in operation the coil 11 is energized by alternating or undulating currents and produces an alternating or undulating flux in the field structure embracing the laminations 9. This flux passes from the legs 10 through the disk 15 and sets up a difference of potential therein between its periphery and its center. When these points are connected to an external circuit as by the frame of the machine and brush 18 through leads 27 and 29 this difference of potential will set up a current which has the same frequency and wave form as the exciting current in coil 11 and this frequency will not be affected by any speed changes or variations of the armature. Since at no time is a material difference of potential created between the brush 18 and the nearby parts of the periphery of the disk 15 all sparking at the brushes is effectively eliminated. This is true whether the armature disk 15 be rotated in one direction or the other. There is no danger of the machine falling out of synchronism since the frequency and phase are dependent alone upon the frequency and phase of the exciting current. When used as a telephone repeater, the feeble telephone current may be dissipated in the field coil 11 and a much stronger current delivered to the leads 27 and 29. The latter current will, however, have the same wave form and all the undulations of the original telephone current. The increased energy produced in the external circuit is derived from the mechanical source of power which drives the armature.

It is evident that such a machine has a very low internal resistance and the radial laminations of the field structure substantially eliminate eddy current losses and materially cut down the distortion due to self induction.

Many minor details and changes may be made in the above apparatus without departing from the spirit or scope of my invention, but

What I claim as new and desire to secure by Letters Patent is:

1. In a field structure for dynamo-electric machines, a plurality of radially arranged laminations having their inner ends in close proximity to each other, so as to form a unipolar field structure.

2. In a field structure for dynamo-electric machines, a plurality of radially arranged laminations having their inner ends in close proximity to each other forming a substantially continuous ring of laminated magnetic material and a magnetizing coil concentric with said ring.

3. In a field structure for dynamo-electric machines, a plurality of radially arranged laminations having their inner ends in close proximity to each other so as to form a unipolar field structure and a magnetizing coil adapted to be connected to a source of alternating current.

4. In an alternating current dynamo-electric machine, a homopolar field structure formed of radial laminations, a field coil partially embraced by said laminations and adapted to be energized by alternating currents and a rotatable metallic armature within said field coil.

5. In a dynamo-electric machine, a field structure embracing radial laminations substantially U-shaped and a field coil located between the legs of the U-shaped laminations.

6. In a dynamo-electric machine, a field structure embracing radial laminations substantially U-shaped and lying in planes substantially parallel with the armature shaft, a field coil arranged between the legs of said U-shaped laminations and an armature arranged to rotate between said legs.

7. In a dynamo-electric machine, a field structure formed of U-shaped laminations, a field coil adapted to be excited by alternating currents located between the legs of said U-shaped laminations, an armature of magnetic material, means for taking off the current generated in said armature and means for rotating said armature between the legs of said U-shaped laminations.

8. In a dynamo-electric machine, a frame provided with a plurality of slots, a plurality of thin plates of magnetic material arranged in said slots, means for magnetically energizing said plates, and an armature.

9. In a dynamo-electric machine, a frame provided with a plurality of radial slots, a plurality of plates of magnetic material arranged in said slots in planes substantially parallel with the shaft, a coil adapted to be energized by alternating currents for magnetically energizing said plates, and a rotatable armature.

10. In a dynamo-electric machine, a frame embracing two side plates each provided with a plurality of radial slots, a plurality of thin plates each of which engages with one of the slots of both of said first mentioned plates, a field coil for energizing said plates magnetically and an armature.

11. In a dynamo electric machine, a frame provided with a plurality of slots, a plurality of thin plates of magnetic material arranged in said slots and means for magnetically energizing said plates.

12. In a dynamo electric machine a field structure formed of magnetic material and U-shaped in cross-section in planes substantially parallel with the shaft, said structure being laminated, a coil adapted to be excited by alternating currents located between the legs of said U-shaped structure, an armature of magnetic material, means for taking off the current generated in said armature and means for rotating said armature between the legs of said U-shaped structure.

In testimony whereof, I have signed my name to this specification, in the presence of two subscribing witnesses.

ALBERT S. HUBBARD.

Witnesses:
GORHAM CROSBY,
EDWIN SEGER.